United States Patent
Mitta (10) Patent No.: US 12,269,767 B2
(45) Date of Patent: Apr. 8, 2025

(54) METHOD FOR MANUFACTURING OPTICAL FIBER PREFORM

(71) Applicant: Shin-Etsu Chemical Co., Ltd., Tokyo (JP)

(72) Inventor: Ryo Mitta, Ibaraki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 104 days.

(21) Appl. No.: 17/489,680

(22) Filed: Sep. 29, 2021

(65) Prior Publication Data

US 2022/0098083 A1 Mar. 31, 2022

(30) Foreign Application Priority Data

Sep. 30, 2020 (JP) ................................. 2020-165892

(51) Int. Cl.
*C03B 37/014* (2006.01)

(52) U.S. Cl.
CPC .. *C03B 37/01446* (2013.01); *C03B 37/01486* (2013.01)

(58) Field of Classification Search
None
See application file for complete search history.

(56) References Cited

U.S. PATENT DOCUMENTS

| | | | |
|---|---|---|---|
| 8,733,131 B2 | 5/2014 | Cocchini | |
| 2010/0071420 A1 | 3/2010 | Nakanishi | |
| 2012/0052302 A1 | 3/2012 | Matusick | |
| 2012/0171454 A1 | 7/2012 | Kondo | |
| 2015/0040616 A1 | 2/2015 | Nakajima | |
| 2022/0098083 A1* | 3/2022 | Mitta | ................ C03B 37/01446 |

FOREIGN PATENT DOCUMENTS

| | | |
|---|---|---|
| CN | 101479205 A | 7/2009 |
| CN | 104098266 A | 10/2014 |
| JP | 2004169110 A | 6/2004 |
| JP | 2005015278 A | 1/2005 |
| JP | 3704991 B2 | 10/2005 |
| JP | 2005272225 A | 10/2005 |

(Continued)

OTHER PUBLICATIONS

CN 203487037 machine translation, Tian, Wen-Zheng, for clamping the clamping disc of the glass rod, Mar. 2014 (Year: 2014).*

(Continued)

*Primary Examiner* — Queenie S Dehghan (57) ABSTRACT

Provided is a method for manufacturing an optical fiber preform includes supporting at least one end of an optical fiber preform with a gripping portion; and heating the optical fiber preform while rotating it to process the optical fiber preform, wherein the optical fiber preform is gripped by the gripping portion via a buffer material comprising the gripping portion; wherein the buffer material includes a surface side member in contact with the optical fiber preform, and a surface side member in contact with the gripping portion; wherein a composition of the surface side member in contact with the optical fiber preform and the surface side member in contact with the gripping portion are different; and the surface side member in contact with the optical fiber preform does not contain any of Ca, Mg, Al, K, Na, Mg, or Ba.

6 Claims, 3 Drawing Sheets

(56) References Cited

FOREIGN PATENT DOCUMENTS

| | | |
|---|---|---|
| JP | 2005272226 A | 10/2005 |
| JP | 2010013352 A | 1/2010 |
| JP | 2010126780 A | 6/2010 |
| JP | 2013536153 A | 9/2013 |
| WO | 2011030716 A1 | 3/2011 |
| WO | 2015046256 A1 | 4/2015 |

OTHER PUBLICATIONS

Chemsec, "The Teflon chemical PTFE is often touted as a safe cousin of toxic PFAS. But is it really?", https://chemsec.org/the-teflon-chemical-ptfe-is-often-touted-as-a-safe-cousin-of-toxic-pfas-but-is-it-really/, Feb. 2022 (Year: 2022).*

Dupont, Teflon PTFE Properties Handbook, http://www.rjchase.com/ptfe_handbook.pdf, Nov. 2012 (Year: 2012).*

Extended European Search Report for European Patent Application No. 21199511.3, issued by the European Patent Office on Feb. 11, 2022.

Office Action issued for counterpart Japanese Application No. 2021-152437, issued by the Japanese Patent Office on Nov. 22, 2022 (drafted on Nov. 14, 2022).

Office Action issued for counterpart Chinese Application 202111026404.4, issued by The State Intellectual Property Office of People's Republic of China on Feb. 27, 2025.

\* cited by examiner

METHOD FOR MANUFACTURING OPTICAL FIBER PREFORM

The contents of the following Japanese patent application(s) are incorporated herein by reference:
NO. 2020-165892 filed in JP on Sep. 30, 2020

BACKGROUND

1. Technical Field

The present invention relates to a method for manufacturing an optical fiber preform.

2. Related Art

In recent years, in order to improve the productivity, the size of optical fiber preforms has been increasing. The optical fiber preform is manufactured by well-known methods, such as the VAD (Vapor Phase Axial Deposition) method and the OVD (Outside Vapor Deposition) method, for example.

Figure 1:
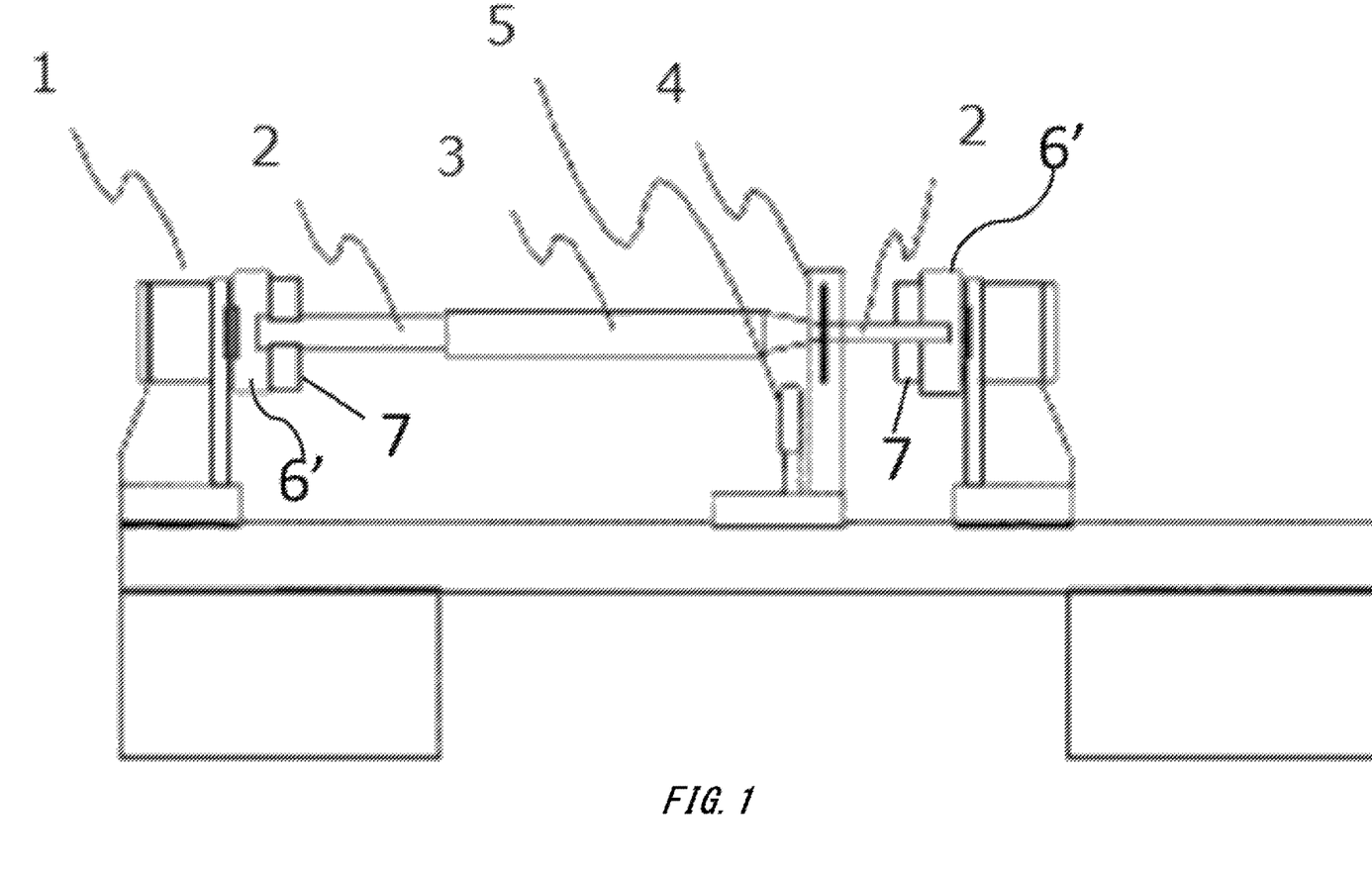
FIG. 1 illustrates a schematic diagram showing an example of a general glass lathe.

The optical fiber preform manufactured by the method is shaped into a form that can be easily used in the subsequent process, for example, using a glass lathe as shown in FIG. 1. Note that FIG. 1 shows a schematic diagram of a general glass lathe. The glass lathe 1 includes an outer diameter measuring device 4, a heating source 5, and a chuck 6, which grips an optical fiber preform 3 via a dummy rod 2. For example, a typical example is to perform stretching processing on a thick diameter cored optical fiber preform manufactured by the VAD method to a narrow diameter by a glass lathe so that an outer layer can be added using the core material of the OVD method.

Generally, in the stretching process on a lathe, firstly, (1) the optical fiber preform 3 and the dummy rod 2 made of quartz glass are gripped at each gripping portion 7 so that their end surfaces are facing each other, and then the end surfaces facing each other are connected by heating the both. Next, (2) open the gripping portion 7 on the optical fiber preform 3 side, grip another dummy rod 2 in the gripping portion 7, place it facing the end surface of the optical fiber preform 3, and heat both end surfaces to connect the both. As a result, the optical fiber preform 3 takes the form of a dummy rod 2 connected to both ends of it. In this way, the optical fiber preform 3 gripped by the glass lathe 1 through the dummy rod 2 is stretching processed and flame polishing processed to be finished into, for example, a core material for the OVD method.

The optical fiber preform manufactured by the OVD method, which includes a core material made by stretching processing optical fiber preform 3 on a glass lathe 1, and an outer layer, may show foreign object at the interface between the core material and the outer layer when illuminated from the outside. Such foreign object is undesirable because it has a risk to cause breakage or transmission loss of the optical fiber when the wire is drawn into the optical fiber.

Patent Document 1 describes a method of chemically etching the surface of an optical fiber preform with hydrofluoric acid and so on, in order to remove foreign object generated at the interface as described above, and then performing glass lathe processing. However, this method leads to higher costs due to the increase in the chemical etching process, and there is a problem that it is difficult to manage the chemical etching amount uniformly in the longitudinal direction for today's larger optical fiber preforms. Patent Document 1: Japanese Patent Application Publication No. 2010-013352.

As a result of analyzing the composition of the foreign object generated at the interface between the core material and the outer layer, the inventors of the present invention discovered that the main composition of the foreign object was alkaline earth metals such as Ca. It is also found that such foreign object was generated at a high frequency at the point where the optical fiber preform was gripped by the glass lathe when the optical fiber preform and the dummy rod were first connected on the glass lathe.

Figure 2:
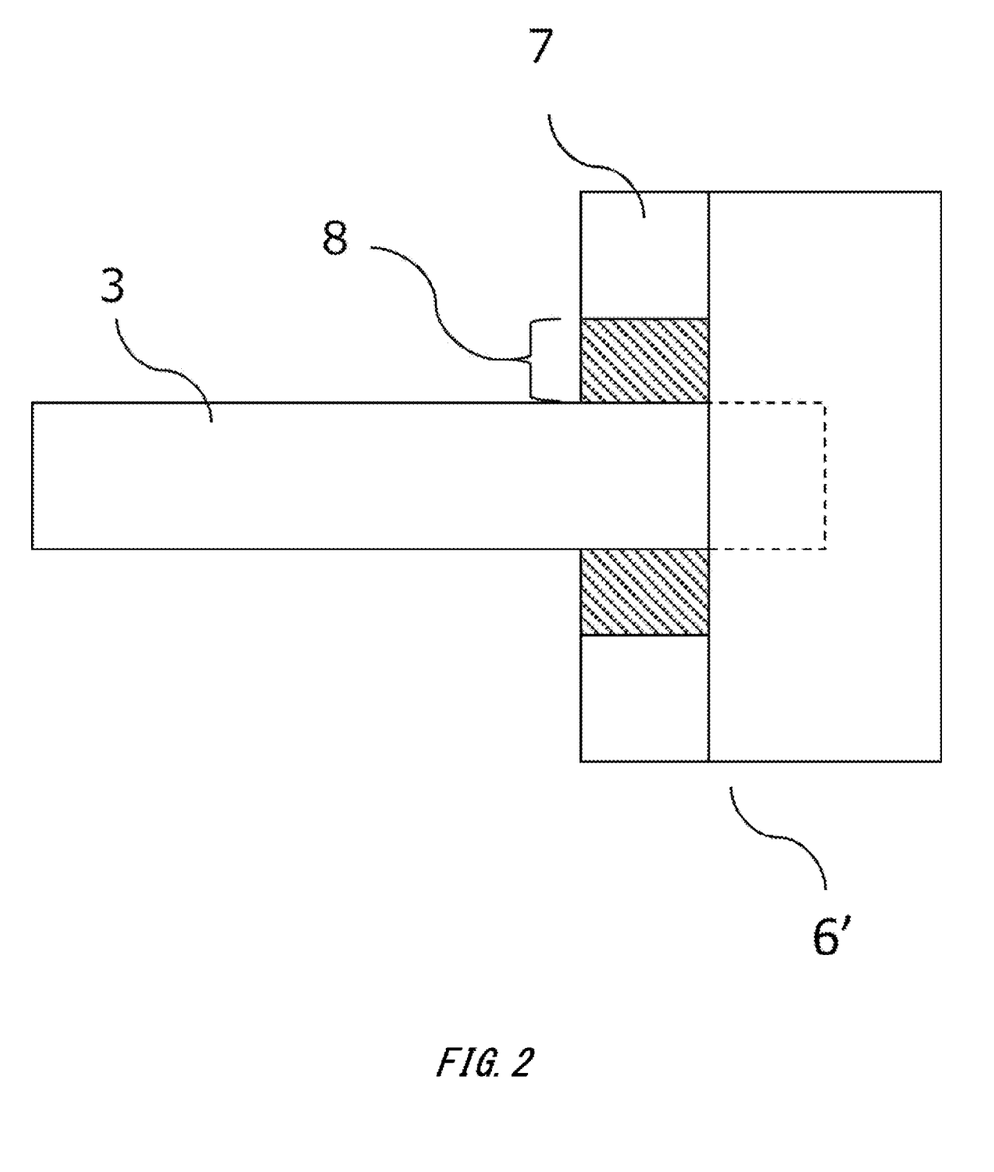
FIG. 2 illustrates a schematic diagram showing an example of a chuck of the general glass lathe.

FIG. 2 shows details of the chuck 6' of the glass lathe 1 (see FIG. 1). The chuck 6 includes a gripping portion 7 and a buffer material 8, and grips the glass preform 3 through the buffer material 8. As explained in FIG. 1, in the processing using the glass lathe 1, the optical fiber preform 3 is gripped by the gripping portion 7 of the chuck 6 by connecting the dummy rod 2 to the optical fiber preform 3 as the first step. In the gripping portion 7, it is common to grip the optical fiber preform 3 through a buffer material 8 to prevent scratching or adhesion of dust to the optical fiber preform 3. However, the gripping portion 7 is heated by the heat of the burner flame of the glass lathe 1 and other factors, and is at a high temperature. In addition, in order to prevent the optical fiber preform 3 from slipping off the gripping portion 7, the optical fiber preform 3 and the buffer material 8 are fastened with strong force. In order to withstand such a high temperature and a strong force, the buffer material 8 is often a sheet of rubber material with inorganic fillers, such as $CaCO_3$ with finer particles, kneaded into it to increase its strength, for example.

By strongly gripping the optical fiber preform 3 with the chuck 6 of the glass lathe 1 through such Ca-containing a buffer material 8, the Ca of the buffer material 8 adheres to the surface of the optical fiber preform 3 and is heated by the radiant heat of the burner flame of the glass lathe 1, which is considered to cause the Ca to dissolve and diffuse into the optical fiber preform 3. When such an optical fiber preform 3 is subjected to the OVD method as a core material, it is assumed that the dissolved Ca is found as a foreign object at the interface between the core material and the outer layer."

The invention was made considering the above-mentioned circumstances, and the purpose of the present invention is to provide a manufacturing method for optical fiber preforms that can eliminate the generation of foreign object at the interface between the core material and the outer layer and can improve the quality of optical fiber preforms manufactured by using glass lathe processed optical fiber preforms as the core material.

General Disclosure

In present invention, the method for manufacturing an optical fiber preform includes supporting at least one end of an optical fiber preform with a gripping portion; and heating the optical fiber preform while rotating it to process the optical fiber preform, wherein the optical fiber preform is gripped by the gripping portion via a buffer material comprising the gripping portion; wherein the buffer material includes a surface side member in contact with the optical fiber preform, and a surface side member in contact with the gripping portion; wherein a composition of the surface side member in contact with the optical fiber preform and the surface side member in contact with the gripping portion are different; and the surface side member in contact with the optical fiber preform does not contain any of Ca, Mg, Al, K, Na, Mg, or Ba.

Also in the present invention, it is preferable that the member of the buffer material on the surface side that contacts the optical fiber preform is made of a rubber material with $SiO_2$ added as a filler, or contains at least one of PTFE, PFA, or polyimide.

Also in the present invention, it is preferable that the member of the buffer material on a surface side in contact with the optical fiber preform contains at least one type of cellulose and lignin.

In the method for manufacturing the optical fiber preform, it is preferable that a member of the buffer material on a surface side in contact with the gripping portion contains at least one of Ca, Mg, Al, K, Na, Mg, and Ba.

Also in the present invention, the buffer material includes at least a first material on a surface side in contact with the optical fiber preform and a second material on a surface side in contact with the gripping portion, wherein a thickness of the first material is preferably from 0.1 mm to 2.0 mm, a thickness of the second material is preferably from 1.0 mm to 3.0 mm, and a total thickness of the buffer material is preferably from 1.1 mm to 4.0 mm.

In the present invention, the method for manufacturing the optical fiber preform makes it possible to process the optical fiber preform on a glass lathe without attaching substances that may cause foreign object to the optical fiber preform, thereby suppressing the generation of foreign object without increasing the number of processes.

DESCRIPTION OF EXEMPLARY EMBODIMENTS

Figure 3:
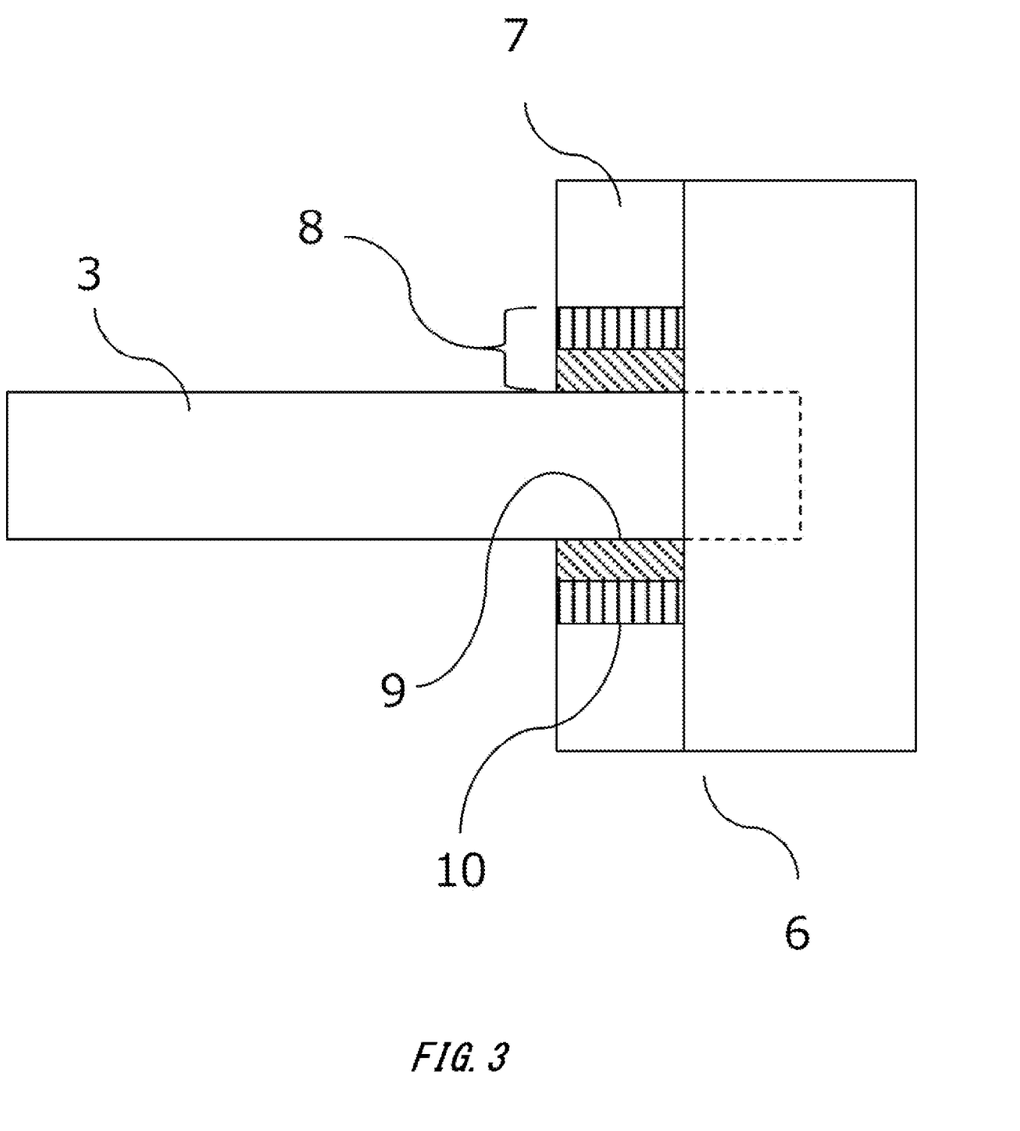
FIG. 3 illustrates a schematic diagram showing an example of a chuck of a glass lathe used in an embodiment of the present invention.

The manufacturing method of the optical fiber preform of the present invention is described below. The following embodiments are not intended to limit the invention according to the claims, and various aspects are possible. FIG. 3 is an example of a chuck of the glass lathe used in the following embodiment example. The chuck 6 includes a gripping portion 7 and a buffer material 8. The buffer material 8 includes a preform contact member 9 and a gripping portion contact member 10. The preform contact member 9 is the member on the surface side of the buffer material 8 that contacts the optical fiber preform 3, and the gripping portion contact member 10 is the member on the surface side of the buffer material 8 that contacts the gripping portion 7. In this way, the buffer material 8 includes a preform contact member 9 on the surface side that contacts the optical fiber preform 3 and a gripping portion contact member 10 on the surface side that contacts the gripping portion, and is composed of a combination of members made of different compositions.

It is preferable that the preform contact member 9 on the surface side in contact with the optical fiber preform does not contain $CaCO_3$ and so on, specifically Ca, Mg, Al, K, Na, Mg, and Ba, and made of a rubber material with $SiO_2$ and so on, added as a filler, or preferably a paper sheet or other material containing cellulose, lignin and so on, as well as PTFE, PFA, and polyimide.

PTFE, PFA, polyimide and so on have excellent durability and cleanliness, and are highly effective in protecting the surfaces of optical fiber preforms from adhesion caused by foreign objects, which are characterized in being slippery on the other hand. There is a possibility of the optical fiber preform 3 slipping out of the chuck 6, or the optical fiber preform 3 slipping out of the chuck 6 when welding the optical fiber preform 3 and dummy rod 2 (dummy glass material).

On the other hand, paper sheets containing cellulose, lignin and so on are inferior to PTFE, PFA, and polyimide in durability, but they are not slippery, so there is no danger of slipping when gripping the optical fiber preform. With these compositions, as a buffer material, comparable performance to rubber materials containing $CaCO_3$ and so on can be obtained, and even if it comes into contact with the optical fiber preform, there is no risk of adhesion of foreign objects that dissolve in the optical fiber preform in the subsequent process.

However, if only materials that do not contain $CaCO_3$ or other fillers, which are inexpensive and easy to formulate, are used for the buffer material 8, the cost burden will be high and the buffer material 8 will wear out quickly due to repeated use. Therefore, on the surface side that does not come into contact with the optical fiber preform 3, that is, the surface side that comes into contact with the gripping portion 7, it is possible to reduce the cost burden and to increase the number of times it can be used repeatedly, by using a conventional rubber material that contains $CaCO_3$ and so on as a filler, specifically Ca, Mg, Al, K, Na, Mg, and Ba.

Also, when the preform contact member 9 on the surface side of the buffer material 8 that contacts the optical fiber preform 3 is the first material, and the gripping portion contact member 10 on the surface side that contacts the gripping portion is the second material, it is desirable to optimize the thickness of each material. This will allow promoting to further optimize cost and durability. Specifically, the thickness of the first material is preferably from 0.1 mm to 2.0 mm, the thickness of the second material is preferably from 1.0 mm to 3.0 mm, and the total thickness of the buffer material 8 is preferably from 1.1 mm to 4.0 mm. If the thickness of each material is out of this range, the strength will decrease or the runout will increase when the optical fiber preform is gripped and rotated.

Note that the buffer material 8 in the present invention is not limited to consist only of the first material and the second material, as long as its total thickness is 4.0 mm or less, and a member made of other composition can be interposed between the first material and the second material.

The buffer material containing the first material and the second material may be created by laminating them together in advance to form a sheet, or it may be used by wrapping the optical fiber preform 3 with a sheet made of the first material and then further wrapping it with a sheet made of the second material so that it does not contact the optical fiber preform 3 on top of the first material. They may also be attached to the gripping portion 7 of the chuck 6 in advance.

Hereinafter, the embodiment examples and comparative examples are given to further explain the present invention in more details, but the present invention is not limited to these embodiment examples in any way.

Embodiment Examples

First, an optical fiber preform with a length of 600 mm in the effective portion and an average outer diameter of 100 mm in the effective portion, manufactured by sintering a porous glass preform obtained by being deposited by the VAD method, was prepared and gripped by one of the gripping portions of the lathe. Then, a dummy rod, made of quartz glass with an outer diameter of 80 mm and a length of 500 mm, was gripped by the other gripping portion of the lathe so that the respective end surfaces were facing each other.

Then, the optical fiber preform and the dummy rod, both gripped in the lathe chuck, were simultaneously seared with an oxyhydrogen flame emitted from the burner at a flow rate of 400 L/min of hydrogen and 200 L/min of oxygen for 5 minutes while rotating at 20 rpm, and then welded.

Next, the gripping portion on the optical fiber preform side was opened, and another dummy rod made of quartz glass with an outer diameter of 80 mm and a length of 500 mm was gripped on the opened gripping portion. Then, the optical fiber preform and the dummy rod were simultaneously seared for 5 minutes at a flow rate of 400 L/min of hydrogen and 200 L/min of oxygen using an oxyhydrogen flame emitted from a burner while both were rotating at 20 rpm, then both end surfaces were welded after that.

As a result, the optical fiber preform took the form of a dummy rod connected to both ends of it. The optical fiber preform was stretched to a final target diameter of 50 mm and an effective length of 2000 mm through a plurality of stretching steps. Then, dummy rods made of quartz glass with an outer diameter of 40 mm and a length of 500 mm were welded to both ends of the optical fiber preform obtained by stretching while rotating at 20 rpm, after being simultaneously seared at a flow rate of 400 L/min of hydrogen and 200 L/min of oxygen for 5 minutes, to finish it as a core material for the OVD method.

As a method for calculating the stretching conditions on the glass lathe, when the outer diameter of the glass preform before stretching is D1, the target outer diameter of the glass preform after stretching is D2, the burner table moving speed is VB, and the tail moving speed is VT, $$VB \times D1^2 = (VT + VB) \times D2^2,$$

herein, the stretching was carried out by controlling VT while keeping VB constant. In this way, an optical fiber preform to be the core material for the OVD method is obtained.

Hereinafter, aspect examples of gripping the optical fiber preform finished as the core material of the above OVD method on the lathe chuck are listed as Comparative Examples 1 to 7 and Embodiment Examples 1 to 24.

Comparative Example 1

The optical fiber preform was wrapped in a 2 mm thick sheet of acrylonitrile butadiene rubber with $CaCO_3$ added as a filler, and the optical fiber preform was gripped in a lathe chuck using it as a buffer material.

Comparative Example 2

The optical fiber preform was wrapped in a 0.5 mm thick sheet of acrylonitrile butadiene rubber with $4MgCO_3 \cdot Mg(OH)_2 \cdot 4H_2O$ added as a filler, and then further wrapped in a 1.5 mm thick sheet of acrylonitrile butadiene rubber with $CaCO_3$ added as a filler. The optical fiber preform was gripped by the lathe chuck using these sheets together as a buffer material.

Comparative Example 3

The optical fiber preform was wrapped in a 0.5 mm thick sheet of acrylonitrile butadiene rubber with $Al(OH)_3$ added as a filler, and then further wrapped in a 1.5 mm thick sheet of acrylonitrile butadiene rubber with $CaCO_3$ added as a filler. The optical fiber preform was gripped by the lathe chuck using these sheets together as a buffer material.

Comparative Example 4

The optical fiber preform was wrapped in a 0.5 mm thick sheet of acrylonitrile butadiene rubber with $Na \cdot K \cdot Al_2Si_2O_5$ added as a filler, and then further wrapped in a 1.5 mm thick sheet of acrylonitrile butadiene rubber with $CaCO_3$ added as a filler. The optical fiber preform was gripped by the lathe chuck using these sheets together as a buffer material.

Comparative Example 5

The optical fiber preform was wrapped in a 0.5 mm thick sheet of acrylonitrile butadiene rubber with $Na(AlSi_3O_{12})_3 \cdot H_2O$ added as a filler, and then further wrapped in a 1.5 mm thick sheet of acrylonitrile butadiene rubber with $CaCO_3$ added as a filler. The optical fiber preform was gripped by the lathe chuck using these sheets together as a buffer material.

Comparative Example 6

The optical fiber preform was wrapped in a 0.5 mm thick sheet of acrylonitrile butadiene rubber with $3MgO \cdot 4SiO_2 \cdot H_2O$ added as a filler, and then further wrapped in a 1.5 mm thick sheet of acrylonitrile butadiene rubber with $CaCO_3$ added as a filler. The optical fiber preform was gripped by the lathe chuck using these sheets together as a buffer material.

Comparative Example 7

The optical fiber preform was wrapped in a 0.5 mm thick sheet of acrylonitrile butadiene rubber with $BaSO_4$ added as a filler, and then further wrapped in a 1.5 mm thick sheet of acrylonitrile butadiene rubber with $CaCO_3$ added as a filler. The optical fiber preform was gripped by the lathe chuck using these sheets together as a buffer material.

Embodiment Example 1

The optical fiber preform was wrapped in a 0.5 mm thick sheet of acrylonitrile butadiene rubber with $SiO_2$ added as a filler, and then further wrapped in a 1.5 mm thick sheet of acrylonitrile butadiene rubber with $CaCO_3$ added as a filler. The optical fiber preform was gripped by the lathe chuck using these sheets together as a buffer material.

Embodiment Example 2

The optical fiber preform was wrapped in a 0.5 mm thick sheet of PTFE, and further wrapped in a 1.5 mm thick sheet of acrylonitrile butadiene rubber with $CaCO_3$ added as a filler, which together served as a buffer material, and the optical fiber preform was gripped by the lathe chuck.

Embodiment Example 3

The optical fiber preform was wrapped in a 0.5 mm thick sheet of PFA, and further wrapped in a 1.5 mm thick sheet of acrylonitrile butadiene rubber with $CaCO_3$ added as a filler, which together served as a buffer material, and the optical fiber preform was gripped by the lathe chuck.

Embodiment Example 4

The optical fiber preform was wrapped in a 0.5 mm thick sheet of polyimide, and further wrapped in a 1.5 mm thick sheet of acrylonitrile butadiene rubber with $CaCO_3$ added as a filler, which together served as a buffer material, and the optical fiber preform was gripped by the lathe chuck.

Embodiment Example 5

The optical fiber preform was wrapped in a 0.5 mm thick paper sheet of Tupperware Zip Towel (product name) made by TRIFE Co., and further wrapped in a 1.5 mm thick sheet of acrylonitrile butadiene rubber with $CaCO_3$ added as a filler, which together served as a buffer material, and the optical fiber preform was gripped by the lathe chuck.

Embodiment Example 6

The optical fiber preform was wrapped in a 0.5 mm thick sheet of acrylonitrile butadiene rubber with $SiO_2$ added as a filler, and then further wrapped in a 1.5 mm thick sheet of acrylonitrile butadiene rubber with $4MgCO_3 \cdot Mg(OH)_2 \cdot 4H_2O$ added as a filler. The optical fiber preform was gripped by the lathe chuck using these sheets together as a buffer material.

Embodiment Example 7

The optical fiber preform was wrapped in a 0.5 mm thick sheet of acrylonitrile butadiene rubber with $SiO_2$ added as a filler, and then further wrapped in a 1.5 mm thick sheet of acrylonitrile butadiene rubber with $Al(OH)_3$ added as a filler. The optical fiber preform was gripped by the lathe chuck using these sheets together as a buffer material.

Embodiment Example 8

The optical fiber preform was wrapped in a 0.5 mm thick sheet of acrylonitrile butadiene rubber with $SiO_2$ added as a filler, and then further wrapped in a 1.5 mm thick sheet of acrylonitrile butadiene rubber with $Na \cdot K \cdot Al_2Si_2O_5$ added as a filler. The optical fiber preform was gripped by the lathe chuck using these sheets together as a buffer material.

Embodiment Example 9

The optical fiber preform was wrapped in a 0.5 mm thick sheet of acrylonitrile butadiene rubber with $SiO_2$ added as a filler, and then further wrapped in a 1.5 mm thick sheet of acrylonitrile butadiene rubber with $Na(AlSi_3O_{12})_3 \cdot H_2O$ added as a filler. The optical fiber preform was gripped by the lathe chuck using these sheets together as a buffer material.

Embodiment Example 10

The optical fiber preform was wrapped in a 0.5 mm thick sheet of acrylonitrile butadiene rubber with $SiO_2$ added as a filler, and then further wrapped in a 1.5 mm thick sheet of acrylonitrile butadiene rubber with $3MgO \cdot 4SiO_2 \cdot H_2O$ added as a filler. The optical fiber preform was gripped by the lathe chuck using these sheets together as a buffer material.

Embodiment Example 11

The optical fiber preform was wrapped in a 0.5 mm thick sheet of acrylonitrile butadiene rubber with $SiO_2$ added as a filler, and then further wrapped in a 1.5 mm thick sheet of acrylonitrile butadiene rubber with $BaSO_4$ added as a filler. The optical fiber preform was gripped by the lathe chuck using these sheets together as a buffer material.

Embodiment Example 12

The optical fiber preform was wrapped in a 0.5 mm thick sheet of acrylonitrile butadiene rubber with $SiO_2$ added as a filler, and then further wrapped in a 1.5 mm thick sheet of PTFE, which together served as a buffer material to grip the optical fiber preform in the lathe chuck.

Embodiment Example 13

The optical fiber preform was wrapped in a 0.5 mm thick sheet of acrylonitrile butadiene rubber with $SiO_2$ added as a filler, and then further wrapped in a 1.5 mm thick sheet of PFA, which together served as a buffer material to grip the optical fiber preform in the lathe chuck.

Embodiment Example 14

The optical fiber preform was wrapped in a 0.5 mm thick sheet of acrylonitrile butadiene rubber with $SiO_2$ added as a filler, and then further wrapped in a 1.5 mm thick sheet of polyimide, which together served as a buffer material to grip the optical fiber preform in the lathe chuck.

Embodiment Example 15

The optical fiber preform was wrapped in a 0.05 mm thick sheet of PTFE, and further wrapped in a 2 mm thick sheet of acrylonitrile butadiene rubber with $CaCO_3$ added as a filler, which together served as a buffer material, and the optical fiber preform was gripped by the lathe chuck.

Embodiment Example 16

The optical fiber preform was wrapped in a 0.1 mm thick sheet of PTFE, and further wrapped in a 2 mm thick sheet of acrylonitrile butadiene rubber with $CaCO_3$ added as a filler, which together served as a buffer material, and the optical fiber preform was gripped by the lathe chuck.

Embodiment Example 17

The optical fiber preform was wrapped in a 1 mm thick sheet of PTFE, and further wrapped in a 2 mm thick sheet of acrylonitrile butadiene rubber with $CaCO_3$ added as a filler, which together served as a buffer material, and the optical fiber preform was gripped by the lathe chuck.

Embodiment Example 18

The optical fiber preform was wrapped in a 2 mm thick sheet of PTFE, and further wrapped in a 2 mm thick sheet of acrylonitrile butadiene rubber with $CaCO_3$ added as a filler, which together served as a buffer material, and the optical fiber preform was gripped by the lathe chuck.

Embodiment Example 19

The optical fiber preform was wrapped in a 2.5 mm thick sheet of PTFE, and further wrapped in a 2 mm thick sheet of acrylonitrile butadiene rubber with $CaCO_3$ added as a filler, which together served as a buffer material, and the optical fiber preform was gripped by the lathe chuck.

Embodiment Example 20

The optical fiber preform was wrapped in a 1 mm thick sheet of PTFE, and further wrapped in a 0.5 mm thick sheet of acrylonitrile butadiene rubber with $CaCO_3$ added as a filler, which together served as a buffer material, and the optical fiber preform was gripped by the lathe chuck.

Embodiment Example 21

The optical fiber preform was wrapped in a 1 mm thick sheet of PTFE, and further wrapped in a 0.8 mm thick sheet of acrylonitrile butadiene rubber with $CaCO_3$ added as a filler, which together served as a buffer material, and the optical fiber preform was gripped by the lathe chuck.

Embodiment Example 22

The optical fiber preform was wrapped in a 1 mm thick sheet of PTFE, and further wrapped in a 1 mm thick sheet of acrylonitrile butadiene rubber with $CaCO_3$ added as a filler, which together served as a buffer material, and the optical fiber preform was gripped by the lathe chuck.

Embodiment Example 23

The optical fiber preform was wrapped in a 1 mm thick sheet of PTFE, and further wrapped in a 2 mm thick sheet of acrylonitrile butadiene rubber with $CaCO_3$ added as a filler, which together served as a buffer material, and the optical fiber preform was gripped by the lathe chuck.

Embodiment Example 24

The optical fiber preform was wrapped in a 1 mm thick sheet of PTFE, and further wrapped in a 3 mm thick sheet of acrylonitrile butadiene rubber with $CaCO_3$ added as a filler, which together served as a buffer material, and the optical fiber preform was gripped by the lathe chuck.

Embodiment Example 25

The optical fiber preform was wrapped in a 1 mm thick sheet of PTFE, and further wrapped in a 3.2 mm thick sheet of acrylonitrile butadiene rubber with $CaCO_3$ added as a filler, which together served as a buffer material, and the optical fiber preform was gripped by the lathe chuck.

A large optical fiber preform was manufactured by externally attaching 80 kg of glass particulate body by the OVD method to the core material gripped in the lathe chuck in Comparative Examples 1 to 7 and Embodiment Examples 1 to 25 above, and then sintering it at 1500° C. to make it transparent glass. After that, light from a halogen lamp was irradiated from the outside to confirm for the presence of foreign object at the interface between the core material and the outer layer.

Table 1 summarizes and shows the compositions and thicknesses of the first material and the second material constituting the buffer materials used in the above Comparative Examples 1 to 7 and Embodiment Examples 1 to 25, the total thickness of the buffer materials, the situation of interfacial foreign object generation between the core material and the outer layer of the large optical fiber preform, as well as the determination of the usability as a buffer material. The determination on the usability of the material as a buffer material was based on a comprehensive assessment of the situation of interfacial foreign object generation, ease of operation, as well as the repeatability of the buffer material. Ease of operation is specifically defined as, for example, the ease of gripping the optical fiber preform when it is gripped by the lathe chuck. In the table, O=no problem, Δ=can be used although there is room for improvement, and x=not usable.

Table 1.

TABLE 1

|  | THE FIRST MATERIAL, OR A FILLER ADDED TO THE FIRST MATERIAL | THICKNESS OF THE FIRST MATERIAL (mm) | THE SECOND MATERIAL, OR A FILLER ADDED TO THE SECOND MATERIAL |
|---|---|---|---|
| COMPARATIVE EXAMPLE 1 | $CaCO_3$ | 2.00 |  |
| COMPARATIVE EXAMPLE 2 | $4MgCO_3 \cdot Mg(OH)_2 \cdot 4H_2O$ | 0.50 | $CaCO_3$ |
| COMPARATIVE EXAMPLE 3 | $Al(OH)_3$ | 0.50 | $CaCO_3$ |
| COMPARATIVE EXAMPLE 4 | $Na \cdot K \cdot Al_2Si_2O_5$ | 0.50 | $CaCO_3$ |
| COMPARATIVE EXAMPLE 5 | $Na(AlSi_3O_{12})_3 \cdot H_2O$ | 0.50 | $CaCO_3$ |
| COMPARATIVE EXAMPLE 6 | $3MgO \cdot 4SiO_2 \cdot H_2O$ | 0.50 | $CaCO_3$ |
| COMPARATIVE EXAMPLE 7 | $BaSO_4$ | 0.50 | $CaCO_3$ |
| EMBODIMENT EXAMPLE 1 | $SiO_2$ | 0.50 | $CaCO_3$ |
| EMBODIMENT EXAMPLE 2 | PTFE | 0.50 | $CaCO_3$ |
| EMBODIMENT EXAMPLE 3 | PFA | 0.50 | $CaCO_3$ |
| EMBODIMENT EXAMPLE 4 | POLYIMIDE | 0.50 | $CaCO_3$ |
| EMBODIMENT EXAMPLE 5 | PAPER SHEET | 0.50 | $CaCO_3$ |

TABLE 1-continued

| | | | | |
|---|---|---|---|---|
| EMBODIMENT EXAMPLE 6 | SiO$_2$ | | 0.50 | 4MgCO$_3$ · Mg(OH)$_2$ · 4H$_2$O |
| EMBODIMENT EXAMPLE 7 | SiO$_2$ | | 0.50 | Al(OH)$_3$ |
| EMBODIMENT EXAMPLE 8 | SiO$_2$ | | 0.50 | Na · K · Al$_2$Si$_2$O$_5$ |
| EMBODIMENT EXAMPLE 9 | SiO$_2$ | | 0.50 | Na(AlSi$_3$O$_{12}$)$_3$ · H$_2$O |
| EMBODIMENT EXAMPLE 10 | SiO$_2$ | | 0.50 | 3MgO · 4SiO$_2$ · H$_2$O |
| EMBODIMENT EXAMPLE 11 | SiO$_2$ | | 0.50 | BaSO$_4$ |
| EMBODIMENT EXAMPLE 12 | SiO$_2$ | | 0.50 | PTFE |
| EMBODIMENT EXAMPLE 13 | SiO$_2$ | | 0.50 | PFA |
| EMBODIMENT EXAMPLE 14 | SiO$_2$ | | 0.50 | POLYIMIDE |
| EMBODIMENT EXAMPLE 15 | PTFE | | 0.05 | CaCO$_3$ |
| EMBODIMENT EXAMPLE 16 | PTFE | | 0.10 | CaCO$_3$ |
| EMBODIMENT EXAMPLE 17 | PTFE | | 1.00 | CaCO$_3$ |
| EMBODIMENT EXAMPLE 18 | PTFE | | 2.00 | CaCO$_3$ |
| EMBODIMENT EXAMPLE 19 | PTFE | | 2.50 | CaCO$_3$ |
| EMBODIMENT EXAMPLE 20 | PTFE | | 1.00 | CaCO$_3$ |
| EMBODIMENT EXAMPLE 21 | PTFE | | 1.00 | CaCO$_3$ |
| EMBODIMENT EXAMPLE 22 | PTFE | | 1.00 | CaCO$_3$ |
| EMBODIMENT EXAMPLE 23 | PTFE | | 1.00 | CaCO$_3$ |
| EMBODIMENT EXAMPLE 24 | PTFE | | 1.00 | CaCO$_3$ |
| EMBODIMENT EXAMPLE 25 | PTFE | | 1.00 | CaCO$_3$ |

| | THICKNESS OF THE SECOND MATERIAL (mm) | TOTAL THICKNESS OF BUFFER MATERIAL (mm) | INTERFACIAL FOREIGN OBJECT GENERATIOR | DETERMINATION ON THE USABILITY OF THE BUFFER MATERIAL |
|---|---|---|---|---|
| COMPARATIVE EXAMPLE 1 | | 2.00 | YES | X |
| COMPARATIVE EXAMPLE 2 | 1.50 | 2.00 | YES | X |
| COMPARATIVE EXAMPLE 3 | 1.50 | 2.00 | YES | X |
| COMPARATIVE EXAMPLE 4 | 1.50 | 2.00 | YES | X |
| COMPARATIVE EXAMPLE 5 | 1.50 | 2.00 | YES | X |
| COMPARATIVE EXAMPLE 6 | 1.50 | 2.00 | YES | X |
| COMPARATIVE EXAMPLE 7 | 1.50 | 2.00 | YES | X |
| EMBODIMENT EXAMPLE 1 | 1.50 | 2.00 | NO | ○ |
| EMBODIMENT EXAMPLE 2 | 1.50 | 2.00 | NO | ○ |
| EMBODIMENT EXAMPLE 3 | 1.50 | 2.00 | NO | ○ |
| EMBODIMENT EXAMPLE 4 | 1.50 | 2.00 | NO | ○ |
| EMBODIMENT EXAMPLE 5 | 1.50 | 2.00 | NO | ○ |
| EMBODIMENT EXAMPLE 6 | 1.50 | 2.00 | NO | ○ |
| EMBODIMENT EXAMPLE 7 | 1.50 | 2.00 | NO | ○ |
| EMBODIMENT EXAMPLE 8 | 1.50 | 2.00 | NO | ○ |
| EMBODIMENT EXAMPLE 9 | 1.50 | 2.00 | NO | ○ |

TABLE 1-continued

| | | | | |
|---|---|---|---|---|
| EMBODIMENT EXAMPLE 10 | 1.50 | 2.00 | NO | ○ |
| EMBODIMENT EXAMPLE 11 | 1.50 | 2.00 | NO | ○ |
| EMBODIMENT EXAMPLE 12 | 1.50 | 2.00 | NO | Δ |
| EMBODIMENT EXAMPLE 13 | 1.50 | 2.00 | NO | Δ |
| EMBODIMENT EXAMPLE 14 | 1.50 | 2.00 | NO | Δ |
| EMBODIMENT EXAMPLE 15 | 2.00 | 2.05 | NO | Δ |
| EMBODIMENT EXAMPLE 16 | 2.00 | 2.10 | NO | ○ |
| EMBODIMENT EXAMPLE 17 | 2.00 | 3.00 | NO | ○ |
| EMBODIMENT EXAMPLE 18 | 2.00 | 4.00 | NO | ○ |
| EMBODIMENT EXAMPLE 19 | 2.00 | 4.50 | NO | Δ |
| EMBODIMENT EXAMPLE 20 | 0.50 | 1.50 | NO | Δ |
| EMBODIMENT EXAMPLE 21 | 0.30 | 1.80 | NO | Δ |
| EMBODIMENT EXAMPLE 22 | 1.00 | 2.00 | NO | ○ |
| EMBODIMENT EXAMPLE 23 | 2.00 | 3.00 | NO | ○ |
| EMBODIMENT EXAMPLE 24 | 3.00 | 4.00 | NO | ○ |
| EMBODIMENT EXAMPLE 25 | 3.20 | 4.20 | NO | Δ |

Comparative Examples 1 to 7 showed foreign object at the interface between the core material and the outer layer, and were inappropriate as buffer materials. On the other hand, no such foreign object was found in Embodiment Examples 1 to 25, and all Embodiment Examples 1 to 25 can withstand the use as buffer materials. In this way, it can be said that it is undesirable for the first material in contact with the optical fiber preform to contain Ca, Mg, Al, K, Na, Mg, or Ba. These are thought to adhere to the surface of the optical fiber preform and dissolve it into the glass during heating in the subsequent process.

In Embodiment Example 1, the first material was acrylonitrile butadiene rubber with $SiO_2$ added as a filler, and no foreign object was observed at the interface between the core material and the outer layer, which was a desirable result obtained. In Embodiment Examples 2 to 5, no foreign object was generated at the interface, and the sheets of PTFE, PFA, and polyimide, as well as the paper sheets, were considered to have a high level of cleanliness clean and desirable.

In comparison to Embodiment Examples 6 to 14, Embodiment Examples 6 to 11 showed sufficient restoring force when the buffer material was fastened and crushed by the chuck and when the chuck was loosened afterwards, sufficient resilience can be confirmed. On the other hand, although Embodiment Examples 12 to 14 were sufficiently durable for use as buffer materials, their resilience was weaker than that of Embodiment Examples 6 to 11. The repellent force of the buffer material is one of the forces that grip the preform, and the fact that the buffer material retains its resilience even after fastening improves the possibility of good repeated use of the buffer material. From this, it can be said that Embodiment Examples 6 to 14 are acceptable as buffer materials, with Embodiment Examples 6 to 11 being superior in terms of resilience and improving the possibility of good repeated use of buffer materials. Therefore, to increase the possibility of good repeated use of the buffer material, it is preferable to include Ca, Mg, Al, K, Na, Mg, and Ba in the second material. Fillers made of these materials can increase the strength and resilience of the material, making it easier to reuse the buffer material, which has economic advantages, even after the chuck has been fastened with strong force.

In the comparison of Embodiment Examples 15 to 25, Embodiment Examples 15, 19 to 21, and 25 showed an acceptable range of runout when gripping and rotating the optical fiber preform. On the other hand, no such runout was observed in Embodiment Examples 16-18 and 22-24. Therefore, Embodiment Examples 15 to 25 are acceptable as buffer materials. In particular, Embodiment Examples 16-18 and 22-24 are superior in terms of ease of gripping and improve the ease of work. Therefore, it can be said that the thickness of the first material is preferably from 0.1 mm to 2.0 mm, the thickness of the second material preferably from 1.0 mm to 3.0 mm, and the total thickness of these buffer materials preferably from 1.1 mm to 4.0 mm. If the thickness of each material is out of this range, the strength will decrease or the runout will increase when the optical fiber preform is gripped and rotated.

Note that the present invention is not limited to the embodiment examples described above, but can be transformed and improved as needed.

What is claimed is:

1. A method for manufacturing an optical fiber preform, comprising supporting at least one end of an optical fiber preform with a gripping portion;
   heating the optical fiber preform while rotating to process the optical fiber preform; and
   inserting a resiliently crushable buffer material between the gripping portion and the optical fiber preform, wherein
   the resiliently crushable buffer material includes a resiliently crushable first member in contact with the optical fiber preform and not in contact with the gripping portion, and a resiliently crushable second member in contact with the gripping portion and not in contact with the optical fiber preform, a composition of the resiliently crushable first member in contact with the optical fiber preform is different from a composition of the resiliently crushable second member in contact with the gripping portion, the resiliently crushable first member in contact with the optical fiber preform does not contain $CaCO_3$, the resiliently crushable second member in contact with the gripping portion does contain $CaCO_3$, and the resiliently crushable first member in contact with the optical fiber preform contains PFA.

2. The method for manufacturing an optical fiber preform according to claim 1, wherein the flexible resiliently crushable buffer material including the resiliently crushable second member in contact with the gripping portion contains at least one of Ca, Mg, Al, K, Na, Mg, and Ba.

3. The method for manufacturing an optical fiber preform according to claim 2, wherein a thickness of the resiliently crushable first member is from 0.1 mm to 2.0 mm, a thickness of the resiliently crushable second member is from 1.0 mm to 3.0 mm, and a total thickness of the resiliently crushable buffer material is from 1.1 mm to 4.0 mm.

4. The method for manufacturing an optical fiber preform according to claim 1, wherein a thickness of the resiliently crushable first member is from 0.1 mm to 2.0 mm, a thickness of the resiliently crushable second member is from 1.0 mm to 3.0 mm, and a total thickness of the resiliently crushable buffer material is from 1.1 mm to 4.0 mm.

5. A method for manufacturing an optical fiber preform, comprising supporting at least one end of an optical fiber preform with a gripping portion;

heating the optical fiber preform while rotating to process the optical fiber preform; and inserting a resiliently crushable buffer material buffer material between the gripping portion and the optical fiber preform, wherein the resiliently crushable buffer material includes a resiliently crushable first member in contact with the optical fiber preform, and a resiliently crushable second member in contact with the gripping portion, a composition of the resiliently crushable first member in contact with the optical fiber preform is different from a composition of the resiliently crushable second member in contact with the gripping portion, the resiliently crushable first member in contact with the optical fiber preform does not contain $CaCO_3$, the resiliently crushable second member in contact with the gripping portion does contain $CaCO_3$, and the resiliently crushable first member in contact with the optical fiber preform contains polyimide.

6. A method for manufacturing an optical fiber preform, comprising supporting at least one end of an optical fiber preform with a gripping portion;

heating the optical fiber preform while rotating to process the optical fiber preform; and inserting a resiliently crushable buffer material between the gripping portion and the optical fiber preform, wherein the resiliently crushable buffer material includes a resiliently crushable first member in contact with the optical fiber preform, and a resiliently crushable second member in contact with the gripping portion, a composition of the resiliently crushable first member in contact with the optical fiber preform is different from a composition of the resiliently crushable second member in contact with the gripping portion, and the resiliently crushable first member in contact with the optical fiber preform does not contain $CaCO_3$, the resiliently crushable second member in contact with the gripping portion does contain $CaCO_3$, and the resiliently crushable first member in contact with the optical fiber preform contains polyimide, and the resiliently crushable second member in contact with the gripping portion contains acrylonitrile butadiene rubber with the $CaCO_3$.

* * * * *